(12) United States Patent
Viswanathan et al.

(10) Patent No.: US 10,187,287 B2
(45) Date of Patent: Jan. 22, 2019

(54) ESTIMATING EFFORT REQUIRED FOR TESTING WEB SERVICES DEPLOYED IN AN ENTERPRISE SYSTEM

(71) Applicant: NIIT Technologies Ltd, New Delhi (IN)

(72) Inventors: Karthik Viswanathan, Bangalore (IN); Pankaj Mendiratta, Bangalore (IN)

(73) Assignee: NIIT Technologies Ltd, New Delhi (IN)

( * ) Notice: Subject to any disclaimer, the term of this patent is extended or adjusted under 35 U.S.C. 154(b) by 149 days.

(21) Appl. No.: 15/279,461

(22) Filed: Sep. 29, 2016

(65) Prior Publication Data
US 2018/0091414 A1 Mar. 29, 2018

(51) Int. Cl.
H04L 12/26 (2006.01)
H04L 29/08 (2006.01)
H04L 12/24 (2006.01)
H04L 29/06 (2006.01)

(52) U.S. Cl.
CPC .......... H04L 43/50 (2013.01); H04L 41/0273 (2013.01); H04L 67/02 (2013.01); H04L 67/42 (2013.01)

(58) Field of Classification Search
CPC ...... H04L 43/50; H04L 67/42; H04L 41/0803
USPC ........ 709/217, 219, 223, 224; 717/124, 126, 717/168
See application file for complete search history.

(56) References Cited

U.S. PATENT DOCUMENTS

| 7,493,521 B1* | 2/2009 | Li .................. G06F 11/3676 714/38.13 |
| 8,375,364 B2* | 2/2013 | Udupa ............... G06F 11/3696 714/38.1 |
| 8,495,576 B2 | 7/2013 | Ndem et al. |
| 8,572,549 B2 | 10/2013 | Ganesh et al. |

(Continued)

OTHER PUBLICATIONS

"Web Services Testing"—Mark Lewis-Prazen, Semantics Scholar, Oct. 2006 https://pdfs.semanticscholar.org/presentation/307c/f27a4366409dbb8ae174e1b031429174a03b.pdf (Year: 2006).*

(Continued)

*Primary Examiner* — Randy A Scott
(74) *Attorney, Agent, or Firm* — IPHorizons PLLC; Narendra Reddy Thappeta

(57) ABSTRACT

An aspect of the present disclosure estimates effort required for testing web services deployed in an enterprise system. In one embodiment, a configuration data specifying complexity levels of web service operations and a number of test cases required for each of the complexity levels is maintained. Upon receiving data specifying a web service (deployed in the enterprise system) sought to be tested, a definition of the web service is inspected to identify web service operations provided by the web service. For each web service operation, a complexity level is determined, and a corresponding number of test cases required to be prepared for the determined complexity level is identified by examining the configuration data. A total number of test cases that is required to be prepared for testing the web service is then computed based on the identified number of test cases for the web service operations of the web service.

17 Claims, 9 Drawing Sheets

(56) References Cited

U.S. PATENT DOCUMENTS

2008/0216059 A1\* 9/2008 Moudgal ............. H04L 41/5083
717/134
2017/0083290 A1\* 3/2017 Bharthulwar ............. G06F 8/20

OTHER PUBLICATIONS

Quynh Pham Thi, Dung Ta Quang, Thang Huynh Quyet, A Complexity Measure for Web Service, Published in: Knowledge and Systems Engineering, 2009. KSE '09, International Conference, Date of Conference: Oct. 13-17, 2009, pp. 1-6, IEEE.
Priya Chaudhary, C.S. Yadav, An Approach for Calculating the Effort Needed on Testing Projects, international Journal of Advanced Research in Computer Engineering & Technology (IJARCET), date Mar. 2012, pp. 35-40, vol. 1, issue 1.
Jorge Cardoso, Complexity analysis of BPEL Web processes, software Process: Improvement and Practice journal, date Oct. 6, 2006, pp. 1-22, vol. 12, Issue 1.
Reducing test effort: A systematic mapping study on existing approaches, http://www.sciencedirect.com/science/article/pii/S0950584912000894, Downloaded circa May 8, 2015, pp. 1-2.
Dinkar Gupta, Service Point Estimation Model for SOA Based Projects, Service Technology Magazine Issue LXXVIII, date Nov. 27, 2013, pp. 1-17.
Testing Estimation, http://www.360logica.com/test-management/testing-estimation/, Downloaded circa May 7, 2015, pp. 1-2.

\* cited by examiner

```xml
<?xml version="1.0" encoding="UTF-8" standalone="no"?>
<definitions xmlns="http://schemas.xmlsoap.org/wsdl/"
    xmlns:tns="http://xmlns.acme.com/apps/oe/soaprovider/plsql/product_management/"
    ...
    name="PRODUCT_MANAGEMENT" targetNamespace="http://xmlns.acme.com/.../prod_man/">
<types>
    <schema xmlns="http://www.w3.org/2001/XMLSchema" elementFormDefault="qualified"
        targetNamespace="http://xmlns.acme.com/apps/.../product_management/getsupplier_details/">
        <include schemaLocation="xsd/APPS_PRODUCT_MANAGEMENT_GETSUPPLIER_DETAILS.xsd"/>
    </schema>
...
</types>
<message name="GETSUPPLIER_DETAILS_Input_Msg">
    <part name="ProductId" type="xsd:string"/>
</message>
<message name="GETSUPPLIER_DETAILS_Output_Msg">
    <part name="ProductId" type="xsd:string"/>
    <part name="productfamily" type="xsd:string"/>
    <part name="Suppliercode" type="xsd:string"/>
    <part name="SupplierName" type="xsd:string"/>
    <part name="Supplieraddress1" type="xsd:string"/>
    <part name="Supplieraddress2" type="xsd:string"/>
    <part name="Suppliercity" type="xsd:string"/>
    <part name="AlternateSuppliercode" type="xsd:string"/>
</message>
<portType name="GETSUPPLIER_DETAILS_PortType">
    <operation name="GETSUPPLIER_DETAILS">
        <input message="tns:GETSUPPLIER_DETAILS_Input_Msg"/>
        <output message="tns:GETSUPPLIER_DETAILS_Output_Msg"/>
    </operation>
</portType>
...
<binding name="PRODUCT_MANAGEMENT_Binding" type="tns:PRODUCT_MANAGEMENT_PortType">
    <soap:binding style="document" transport="http://schemas.xmlsoap.org/soap/http"/>
    <operation name="GETSUPPLIER_DETAILS">
    <soap:operation soapAction="GETSUPPLIER_DETAILS"/>
    <input>
        <soap:header message="tns:GETSUPPLIER_DETAILS_Input_Msg" part="header" use="literal"/>
        <soap:body parts="body" use="literal"/>
    </input>
    <output><soap:body use="literal"/></output>
    </operation>
</binding>
...
<service name="PRODUCT_MANAGEMENT_Service">
    <port name="PRODUCT_MANAGEMENT_Port" binding="tns:PRODUCT_MANAGEMENT_Binding">
        <soap:address location="http://www.acme.com/product/"/>
    </port>
</service>
...
</definitions>
```

350 — message definitions
360 — portType
370 — binding
380 — service

*FIG. 3C*

Web Service Operation Complexity Level Determination

| Web Service Name | Web Service Operation Name | Elements in Request | Elements in Response | Transformations/ Conditions | Downstream Interactions | Complexity Level |
|---|---|---|---|---|---|---|
| CUSTOMER | GETCUSTDETAILS | 5 | 20 | 1 | 1 | Medium |
| CUSTOMER | GETCUSTADDRESS | 5 | 25 | 2 | 1 | Medium |
| PRODUCT_MANAGMENT | GETPRODUCT_NAME | 10 | 5 | 5 | 0 | Low |
| PRODUCT_MANAGMENT | GETSUPPLIER_DETAILS | 3 | 50 | 10 | 3 | High |
| ... | ... | ... | ... | ... | ... | ... |

Estimate

FIG. 4B

Test Effort Estimation

Test Estimation Results   450

Web Service Name: PRODUCT_MANAGMENT

Number of Web Service Operations: 40

460

| Complexity Level | Total Cases | Low | Medium | High |
|---|---|---|---|---|
| High | 80 | 10% | 35% | 55% |
| Medium | 45 | 25% | 50% | 25% |
| Low | 20 | 50% | 40% | 10% |

470

| EFFORT FOR TEST DESIGNING (ETD) | |
|---|---|
| Test Planning Activities | Effort in hours |
| Test Case Preparation Effort (TPE) | 1054 |
| Test Data Preparation (15% of TPE) | 158.1 |
| Review Effort (10% of TPE) | 105.4 |
| Management Effort (7% of TPE) | 73.78 |

480

| EFFORT FOR TEST EXECUTION per CYCLE (ETE) | |
|---|---|
| Test Execution Activities | Effort in hours |
| Test Case Execution Effort (TEE) | 274 |
| Test Result Analysis/Reporting (7% of TEE) | 19.18 |
| Defect Management Effort (10% of TEE) | 27.4 |
| Project Management Activities (7% of TEE) | 19.18 |

490

| TOTAL TEST EFFORT = 2170.8 hours | |
|---|---|
| Testing Activities | Effort in hours |
| Effort for Test Designing (ETD) | 1391.28 |
| Effort for Test Execution (ETE) | 339.76 |
| Number of Execution Cycles (Ec) | 2 |
| Effort for overcoming Risk (Er) | 100 |

FIG. 4C

ESTIMATING EFFORT REQUIRED FOR TESTING WEB SERVICES DEPLOYED IN AN ENTERPRISE SYSTEM

BACKGROUND OF THE DISCLOSURE

Technical Field

The present disclosure relates to enterprise systems and more specifically to estimating effort required for testing web services deployed in an enterprise system.

Related Art

An enterprise system refers to a computing execution environment in which one or more enterprise applications are implemented to perform various enterprise functionalities. The execution environment is implemented based on one or more digital processing systems connected suitably by networks.

Web services are often used to expose the enterprise functionalities over the networks and are available at respective end points (e.g., URLs). Each web service provides multiple web service operations corresponding to the enterprise functionalities sought to be exposed. In general, a number of web services are deployed in an enterprise system according to specific requirements of the enterprise.

Testing of web services commonly entails identifying, preparing/designing and executing test cases to test the various web service operations provided by the web services. There is a general need to estimate effort required for testing web services deployed in an enterprise system.

BRIEF DESCRIPTION OF THE DRAWINGS

Example embodiments of the present disclosure will be described with reference to the accompanying drawings briefly described below.

FIG. 3C depicts a portion of a definition of a web service in one embodiment.

FIGS. 4A-4B together illustrate the manner in which user inputs for determining complexity levels of web service operations are provided in one embodiment.

FIG. 4C illustrates the manner in which the estimated effort required for testing a web service is displayed in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
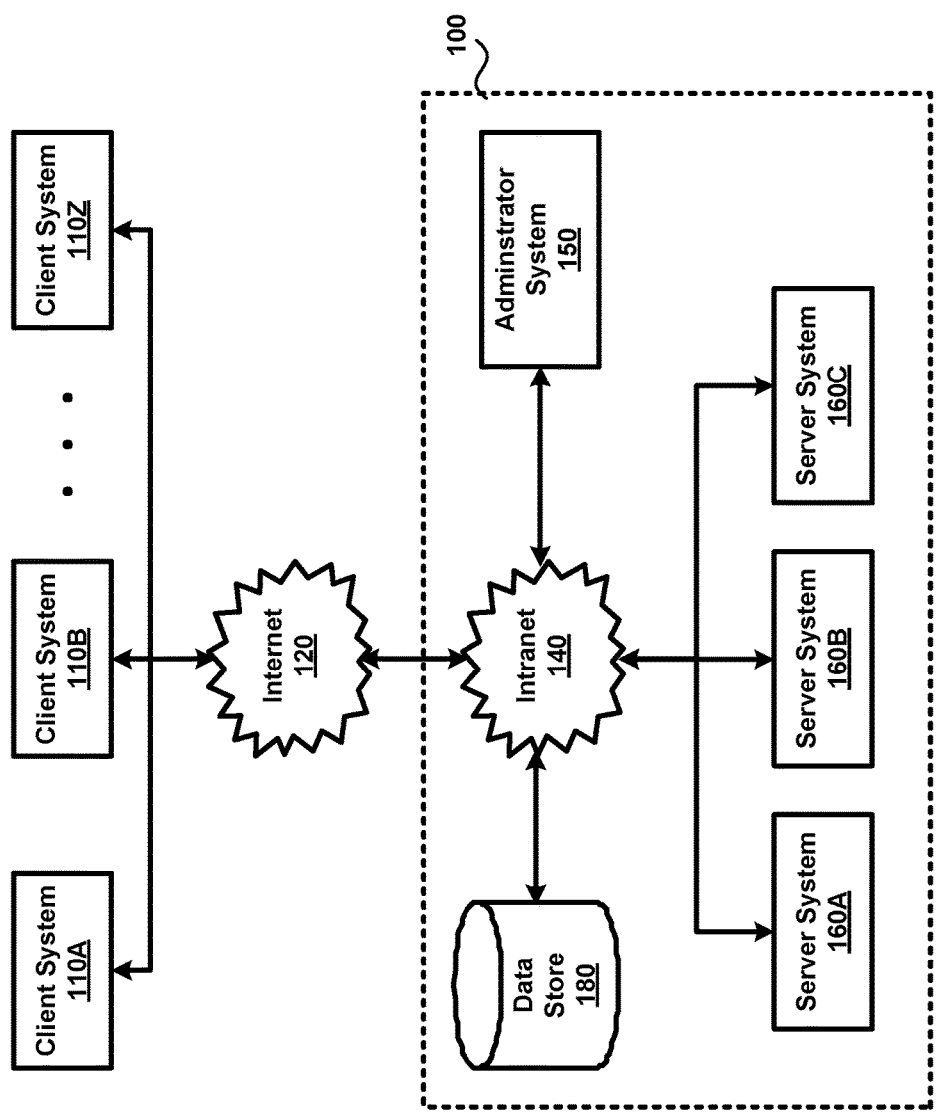
FIG. 1 is a block diagram illustrating an example environment (computing system) in which several aspects of the present disclosure can be implemented.

An aspect of the present disclosure facilitates estimating effort required for testing web services deployed in an enterprise system. In one embodiment, a configuration data specifying complexity levels of web service operations and a number of test cases required for each of the complexity levels is maintained. Upon receiving data specifying a web service (deployed in the enterprise system) sought to be tested, a definition of the web service is inspected to identify web service operations provided by the web service. Then, for each web service operation, a complexity level is determined, and a corresponding number of test cases required to be prepared for the determined complexity level is identified by examining the configuration data.

A total number of test cases that are required to be prepared for testing the web service are then computed based on the identified number of test cases for each web service operation of the web service. It may be appreciated that the total number of test cases computed for a web service provides an estimate on the effort required for testing the web service.

According to another aspect of the present disclosure, the configuration data (noted above) specifies for each complexity level, a split of the corresponding number of test cases among a set of test case complexity categories. Accordingly, the number of test cases identified for a web service operation includes individual number of test cases for each of the set of test case complexity categories, with the total number of test cases computed for the web service also includes individual number of test cases for each of the set of test case complexity categories.

According to one more aspect of the present disclosure, upon receiving a corresponding design effort and a corresponding execution effort for each of the set of test case complexity categories (noted above), a total design effort required for preparing the total number of test cases and a total execution effort for execution of the total number of test cases is calculated based on the individual number of test cases computed, the received corresponding design effort, and the received corresponding execution effort for each of the set of test case complexity categories.

According to yet another aspect of the present disclosure, the inspecting of the definition of a web service (sought to be tested) identifies for a web service operation, a first number of input parameters for the web service operation and a second number of output parameters for the web service operation. In addition, a third number and a fourth number is received from a user, with the third number indicating a number of transformations and conditions implemented in the web service operation and the fourth number indicating a number of downstream systems the web service operation interacts with. Accordingly, the complexity level of the web service operation is determined based on the first number, the second number, the third number and the fourth number. In one embodiment, each complexity level is defined by a corresponding set of ranges for each of the first number, the second number, the third number and the fourth number.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (enterprise system 100) in which several aspects of the present disclosure can be implemented. The block diagram is shown containing client systems 110A-110Z, Internet 120, intranet 140, administrator system 150, server systems 160A-160C, and data store 180.

Merely for illustration, only representative number/type of systems is shown in FIG. 1. Many environments often contain many more systems, both in number and type, depending on the purpose for which the environment is designed. Each block of FIG. 1 is described below in further detail.

Intranet 140 represents a network providing connectivity between server systems 160A-160C, administrator system 150 and data store 180, all provided within an enterprise (as indicated by the dotted boundary). Internet 120 extends the connectivity of these (and other systems of the enterprise) with external systems such as client systems 110A-110Z. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies the target application, the packet may be said to be directed to such application as well.

Data store 180 represents a non-volatile (persistent) storage facilitating storage and retrieval of a collection of data by applications executing in server systems 160A-160C (and also administrator system 150). Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Each of client systems 110A-110Z represents a system such as a personal computer, workstation, mobile device, computing tablet etc., used by users to generate client requests directed to enterprise applications executing in server system 160A-160C. In one embodiment, the client requests are directed to invoking web services exposed by server systems 160A-160C, with each web service being available at a corresponding end point. Each web service may provide multiple web service operations corresponding to enterprise functionalities sought to be exposed.

The client requests may be generated using appropriate user interfaces (e.g., web pages provided by an application executing in server systems, a native user interface provided by a portion of the application downloaded from server systems, etc.). In general, an client system requests an enterprise application/web service for performing desired tasks/web service operations and receives the corresponding responses (e.g., web pages) containing the results of performance of the requested tasks. The web pages/responses may then be presented to the user by the client applications such as the browser. Each client request is sent in the form of an IP packet directed to the desired server system, application or web service, with the IP packet including data identifying the desired tasks/web service operations in the payload portion.

Each of server systems 160A-160C represents a server, such as a web/application server, executing server applications and web services performing tasks/web service operations requested by users using one of client systems 110A-110Z. A server system may use data stored internally (for example, in a non-volatile storage/hard disk within the server system), external data (e.g., maintained in data store 180) and/or data received from external sources (e.g., from the user) in performing the requested tasks/web service operations. The server system then sends the result of performance of the tasks/web service operations to the requesting client system (one of 110A-110Z). The results may be accompanied by specific user interfaces (e.g., web pages) for displaying the results to the requesting user.

Testing of web services exposed by server systems of an enterprise (shown within the dotted boundary) is commonly performed using test cases. As is well known, a test case is used to verify the compliance of software under test (here, a web service) against a specific requirement. A test case typically specifies pre-conditions, test data, expected results and post-conditions, with testing using the test case entailing ensuring that pre-conditions and post-conditions are satisfied, providing the test data to the software under test/web service and then determining whether the results generated by the software matches the expected results. If the generated results do not match the expected results, the test case is deemed to have failed and the software/web service is deemed to be in non-compliance with the specific requirement (of the test case).

As an enterprise system (100) typically exposes a large number of web services, it may be desirable that, prior to testing the web services, an estimated effort required for testing the web services be determined. The effort required for testing a web service may be specified as the number of test cases to be prepared for testing and/or the total time (in hours or days) required for preparing and executing a required number of test cases against the web service. However, there are several challenges to arriving at an accurate estimated effort.

One challenge is that the nature of web service operations (they are loosely coupled, response can be synchronous/asynchronous, they are highly interoperable) makes it difficult to estimate the effort required for testing the web services. Another challenge is that a web service that is simple from a development perspective may be complex from testing perspective as the testing may involve testing of different operations in the web service and each operation may need to be tested for different combinations of data for positive and negative scenarios. Furthermore, it may be desirable that effort be estimated for testing individual and sequence/combinations of web service operations in a web service.

Administrator system 150, provided according to several aspects of the present disclosure, estimates effort required for testing web services deployed in an enterprise system, while overcoming some of the challenges noted above. The manner in which administrator system 150 estimates effort required for testing a web service is described below with examples.

3. Estimating Effort for Testing a Web Service

Figure 2:
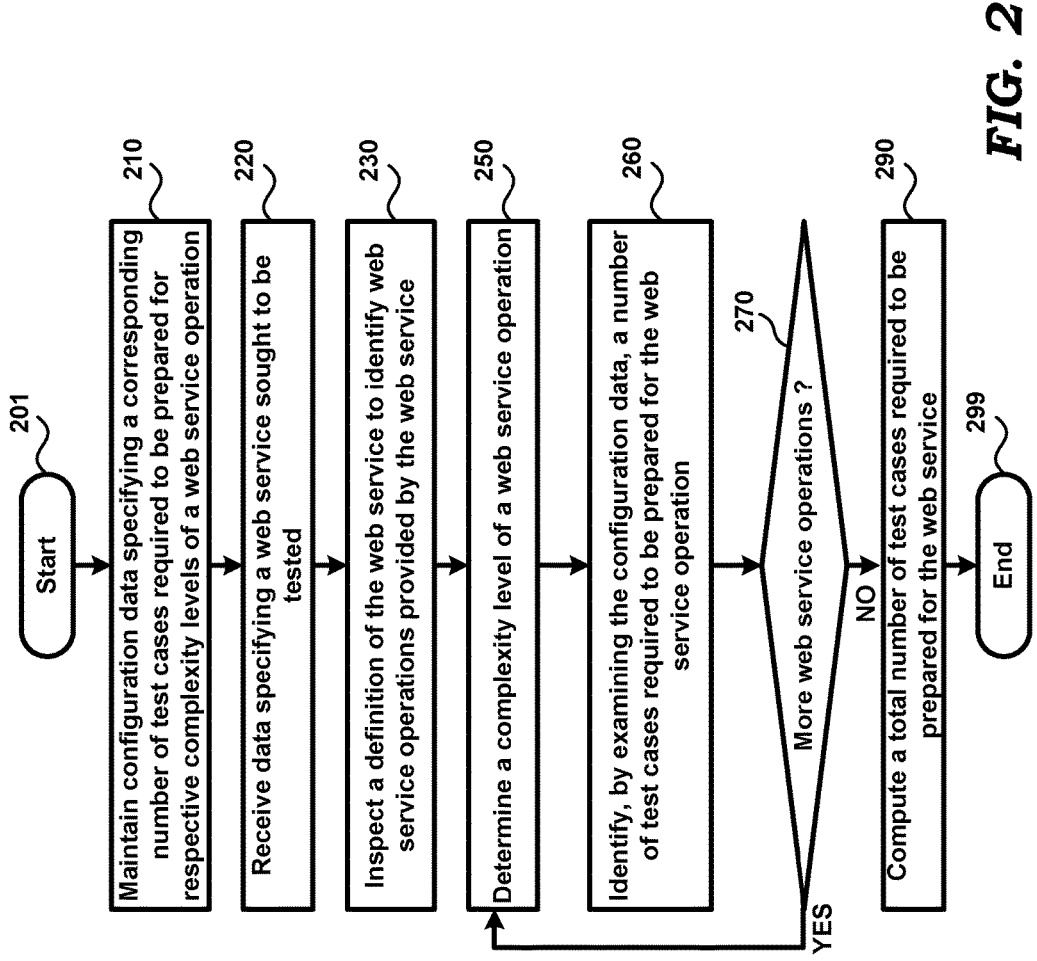
FIG. 2 is a flow chart illustrating the manner in which effort required for testing web services deployed in an enterprise system is estimated according to an aspect of the present disclosure.

FIG. 2 is a flow chart illustrating the manner in which the effort for testing of a web service deployed in an enterprise environment (100) is estimated according to an aspect of the present disclosure. The flowchart is described with respect to administrator system 150 of FIG. 1 merely for illustration. However, many of the features can be implemented in other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, administrator system 150 maintains a configuration data specifying a corresponding number of test cases required to be prepared for respective complexity levels of a web service operation. The complexity level of a web service operation indicates the testing complexity for the web service operation, and is typically dependent on factors such as number of input parameters for the web service operation, the number of output parameters for the web service operation, etc. The configuration data may be stored (in corresponding tables or in text files) in data store 180.

In step 220, administrator system 150 receives data specifying a web service sought to be tested. The data may be received from a user accessing a corresponding user interface displayed on one of client systems 110A-110Z. The received data typically specifies the end point (URL) at which the web service is available in the enterprise system.

In step 230, administrator system 150 inspects the definition of the web service to identify web service operations provided by the web service. The definition of the web service specifies the web service operations and also the name and type of input and/or output parameters for each of the identified web service operations. The web service definition is often in the form of a file according to web service definition language (WSDL), as is well known.

In step 250, administrator system 150 determines a complexity level of a web service operation (from the list of web service operations identified in step 230). The various factors noted above (that the complexity level is dependent on) is first identified and/or received from a user. For example, the number of input/output parameters may be identified as part of inspecting the definition of the web service (in step 230). The complexity level is then determined based on the identified/received factors/numbers. For example, each of the complexity levels may be specified by a corresponding set of ranges, with the complexity level determined based on the set of ranges which includes the identified/received numbers.

In step 260, administrator system 150 identifies, by examining the configuration data, a number of test cases required to be prepared for the web service operation. In particular, administrator system 150 identifies the number of test cases specified in the configuration data for the complexity level determined (e.g. "High") for the web service operation in step 250.

In step 270, administrator server 150 checks whether there are more web service operations provided by the web service for computing the testing effort for the web service. In the scenario that there are more web service operations, the control passes to step 250, whereby the steps of determining the complexity level for another web service operation and identifying the number of test cases required to be prepared for the another web service operation is performed. Control continues to pass to step 250 until the number of test cases required to be prepared for all the web service operations provided by the web service is identified, upon which control passes to step 290.

In step 290, administrator system 150 computes a total number of test cases required to be prepared for the web service (sought to be tested). Administrator system 150 computes the total number of test cases for the web service by adding all of the number of test cases required to be prepared (identified above in step 260) for each web service operation provided by the web service. The computed total may be provided as a response to the receiving of the data in step 220. The flow chart ends in step 299.

Thus, by computing the total number of test cases required to be prepared for a web service (sought to be tested) based on the number of test cases required for each of the web service operations provided by the web service, a more accurate estimate of the effort required for testing is provided. According to other aspects of the present disclosure, a total design effort required for preparing the total number of test cases and a total execution effort for execution of the total number of test cases is also calculated and provided (for example, displayed) to the user.

Furthermore, though FIG. 2 above describes estimating the effort required for a single web service, it may be appreciated that in the scenario that the effort for multiple web services is sought to be estimated, the operations of FIG. 2 may be repeatedly performed for each web service in the multiple web services, and the total number of test cases for the multiple web services may be computed as the sum of the total number of test cases computed for each web service. The manner in which administrator system 150 estimates the effort required for testing a single web service according to FIG. 2 is illustrated below with examples.

4. Illustrative Example

FIGS. 3A-3C and 4A-4C together illustrate the manner in which the effort required for testing a web service (deployed in enterprise system 100) is estimated in one embodiment. Each of the Figures is described in detail below.

Figure 3A:
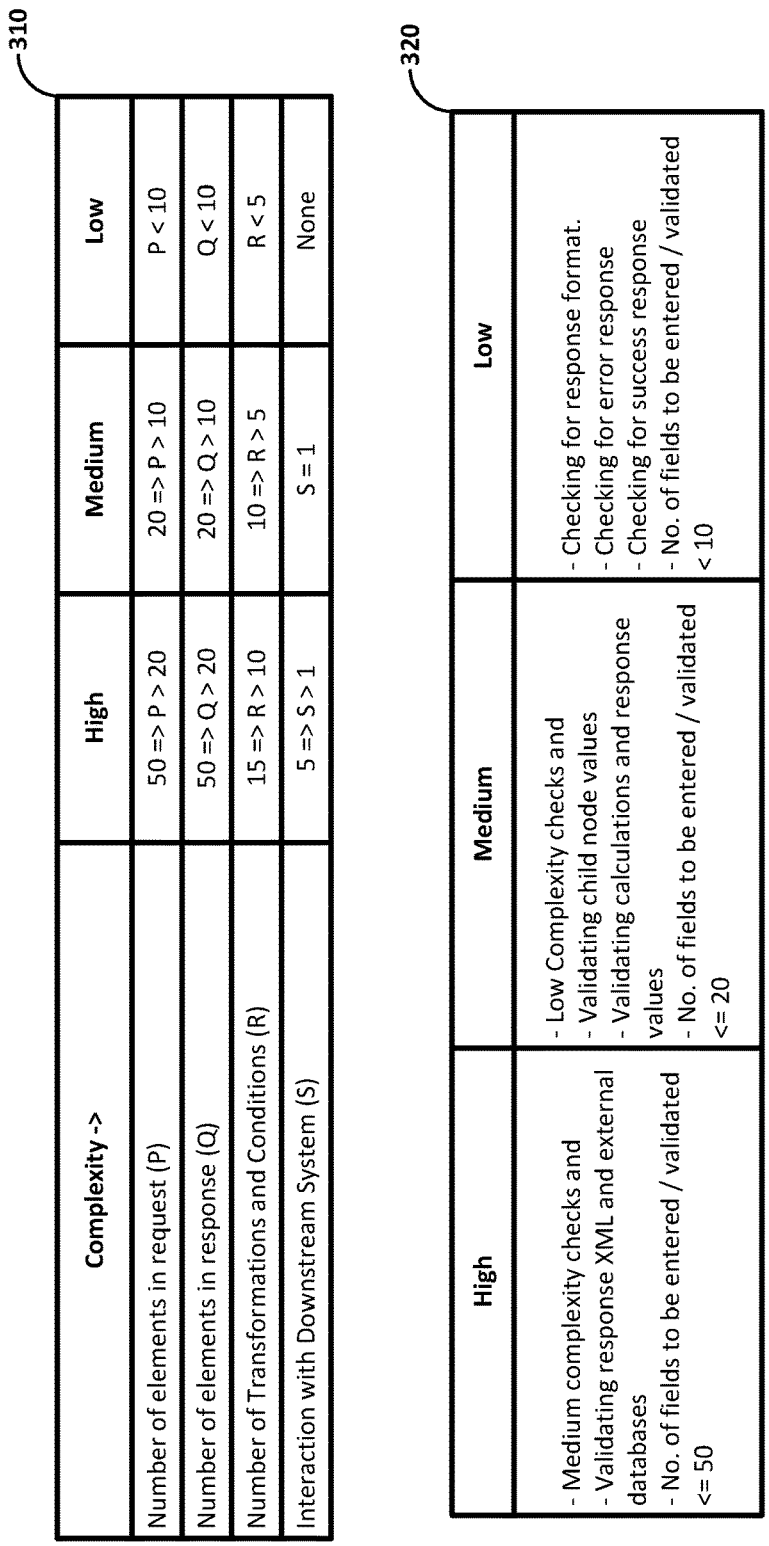
FIG. 3A depicts the set of complexity levels for web service operations and the set of test case complexity categories in one embodiment.

FIG. 3A depicts the set of complexity levels for web service operations and the set of test case complexity categories in one embodiment. For illustration, both of the set of complexity levels for web service operations and the set of test case complexity categories are assumed to be the same set containing the values/labels ["High", "Medium", "Low"]. However, in alternative embodiments, the set of complexity levels and the set of test case categories may be different sets having different or same sets of values/labels, as will be apparent to one skilled in the relevant arts by reading the disclosure herein.

Table 310 depicts the set of complexity levels as corresponding columns, while the rows specifies the factors based on which the complexity level of a web service operation is determined. Table 310 indicates that the complexity levels are dependent on the number (P) of elements in the client request sent to the web service operation (that is, the input parameters for the web service operation), the number (Q) of elements in the client response received from the web service operation (that is, the output parameters for the web service operation), the number (R) of transformations and conditions implemented (functional complexity) in the web service operation, and the number (S) of downstream systems the web service operation interacts with.

Table 310 further indicates the corresponding set of ranges for the four numbers P, Q, R and S noted above. In particular, a web service operation is determined to be having complexity level "High" if the number of elements in the request is between 50 and 20 (specifically, 50>=P>20), the number of elements in the response is between 50 and 20 (specifically, 50>=Q>20), the number of transformations is between 15 and 10 (specifically, 15>=R>10) and the number of downstream systems is 5 and 1 (specifically, 5>=S>1).

Similarly, the other columns of table 310 specify corresponding sets of ranges for the four numbers P, Q, R and S for other complexity levels. In one embodiment, the complexity level is determined based on the highest range in which includes any one of the identified/received values for P, Q, R and S. For example, for a specific web service operation, if the value of P is included/within the range 10 to 20 (corresponding to "Medium" complexity level), while the values for Q, R and S are included in/within the corresponding ranges for the "Low" complexity level, the complexity level of the web service operation is determined to be "Medium" (since P is in the highest range).

Table 320 depicts the set of test case complexity categories as corresponding columns, while the row specifies the basis for classifying a test case as a corresponding category. The test case category for a test case is typically specified by a user/tester when creating the test case. It should be noted that only a sample list of factors is shown herein for illustration, and in actual embodiments, the number/type of factors may vary as suitable to the environment in which the features of the present disclosure are sought to be implemented. Furthermore, the ranges specified for the different factors may be conveniently chosen to capture the complexity level of web service operations and/or test case categories for a test case.

The description is continued with respect to the manner in which administrator system 150 maintains configuration data in one embodiment.

5. Configuration Data

Figure 3B:
FIG. 3B depicts a portion of a configuration data maintained in one embodiment.

FIG. 3B depicts a portion of a configuration data maintained in data store in one embodiment. For illustration, data store 180 is assumed to be a file server with the configuration data assumed to be stored as a file (named as "CONFIG.xml") according to extensible markup language (XML) in the file server. However, in alternative embodiments, the configuration data may be maintained according to other data formats and/or using other data structures (such as a table in a relational database), as will be apparent to one skilled in the relevant arts by reading the disclosure herein.

It may be observed that the configuration data (indicated by "TEConfig" XML tag) specifies the configuration corresponding to each of the complexity levels "High", "Medium", "Low") for web service operation. In particular, data portion 330 ("serviceoperation" XML tag) specifies the configuration for the complexity level "High" (as indicated by the value of the attribute "complexity" in the XML tag).

According to an aspect of the present disclosure, the configuration data specifies for each complexity level of web service operation, a split of the corresponding number of test cases among the set of test case complexity categories "High", "Medium" and "Low". Thus, data portion 330 indicates for complexity level "High", the total number of test cases ("totalTC" XML tag) is 80, the split-up of the total number of test cases between the test case categories "Low", "Medium" and "High" (respectively indicated by "lowTC", "mediumTC", "highTC" XML tags) is 10%, 35% and 50% of the total number of test cases.

In addition, the configuration data also specifies the time (in minutes) required to design and execute a test case belonging to each of the test case categories. Specifically, data portion 330 indicates that the design and execution time for Low test case complexity ("lowTCdesign" and "lowTCexecute" XML tags) is 20 minutes and 6 minutes respectively. Similarly, data portion 330 indicates the design and execution time for Medium test case complexity ("mediumTCdesign" and "mediumTCexecute" XML tags) is 30 minutes and 8 minutes respectively and also that for High test case complexity ("highTCdesign" and "highTCexecute" XML tags) is 45 minutes and 11 minutes respectively.

Similarly, the other data portions of configuration data of FIG. 3B specify the configuration for other complexity levels for web service operations. It may be readily observed that the total number of test cases for higher complexity levels is generally more than the corresponding total number for lower complexity levels. Also, as the complexity level of the web service operation increases, the split up of the total number of test cases is biased more towards High test case category. For example, for a complexity level "Low" web service operation the number of test cases of High test case category is only "10%", while for a complexity level "High" web service operation, the number of test cases of High test case category is "55%".

The description is continued with respect to an example web service definition that is inspected by administrator system 150.

6. Web Service Definition

FIG. 3C depicts a portion of a definition of a web service (according to WSDL) in one embodiment. The definition is assumed to be in the form of a WSDL file (for example, named as "PRODUCT_MANAGEMENT_soap.wsdl"). In one embodiment, administrator system 150 downloads the WSDL file from the end point/URL of the web service. In another embodiment, the definitions of the web services are maintained as corresponding WSDL files in data store 180 (as a file server) and/or any of server systems 160A-160C. It may be appreciated that in alternative embodiments, the web service definition may be specified according to other data formats and stored in other types of data stores (for example, in a relational table) as will be apparent to one skilled in the relevant arts by reading the disclosure herein.

Data portion 350 specifies various message formats, while data portion 360 specifies the corresponding input/output parameters of the service in terms of the message formats defined in data portion 350. Data portion 360 specifies the format of invoking the service (sending the request), the format of the response, etc. Data portion 370 indicates the operation "GETSUPPLER_DETAILS" that can be invoked/accessed by external systems as part of the web service. Data portion 380 indicates the URL and port (together, the end point) at which the web service can be accessed. In particular, data portion 380 indicates that the end point of the web service is "http://www.acme.com/product/".

In the web service definition shown in FIG. 3C, web service "PRODUCT_MANAGMENT" is defined as providing a web service operation named "GETSUPPLIER_DETAILS" and the web service operation is defined as receiving a value of a input parameter named "ProductId" and sending, in response to the request, data values for output parameters "ProductId", "Productfamily", "Suppliercode", "SupplierName", "Supplieraddress1", "Supplieraddress2", "Suppliercity", and "AlternateSuppliercode".

It should be noted that only a sample web service definition is shown herein for illustration, and in actual embodiments, the number of web service operations and the corresponding input/output parameters may vary as suitable to the environment in which the features of the present disclosure are sought to be implemented.

As noted above, administrator system 150 accepts input data from users prior to computing the effort required for testing web services deployed in an enterprise system (100). Some sample user interfaces provided by administrator system 150 for receiving the input data and the manner in which administrator system 150 processes the input data is described below with examples.

7. Sample User Interfaces

Figure 4A:
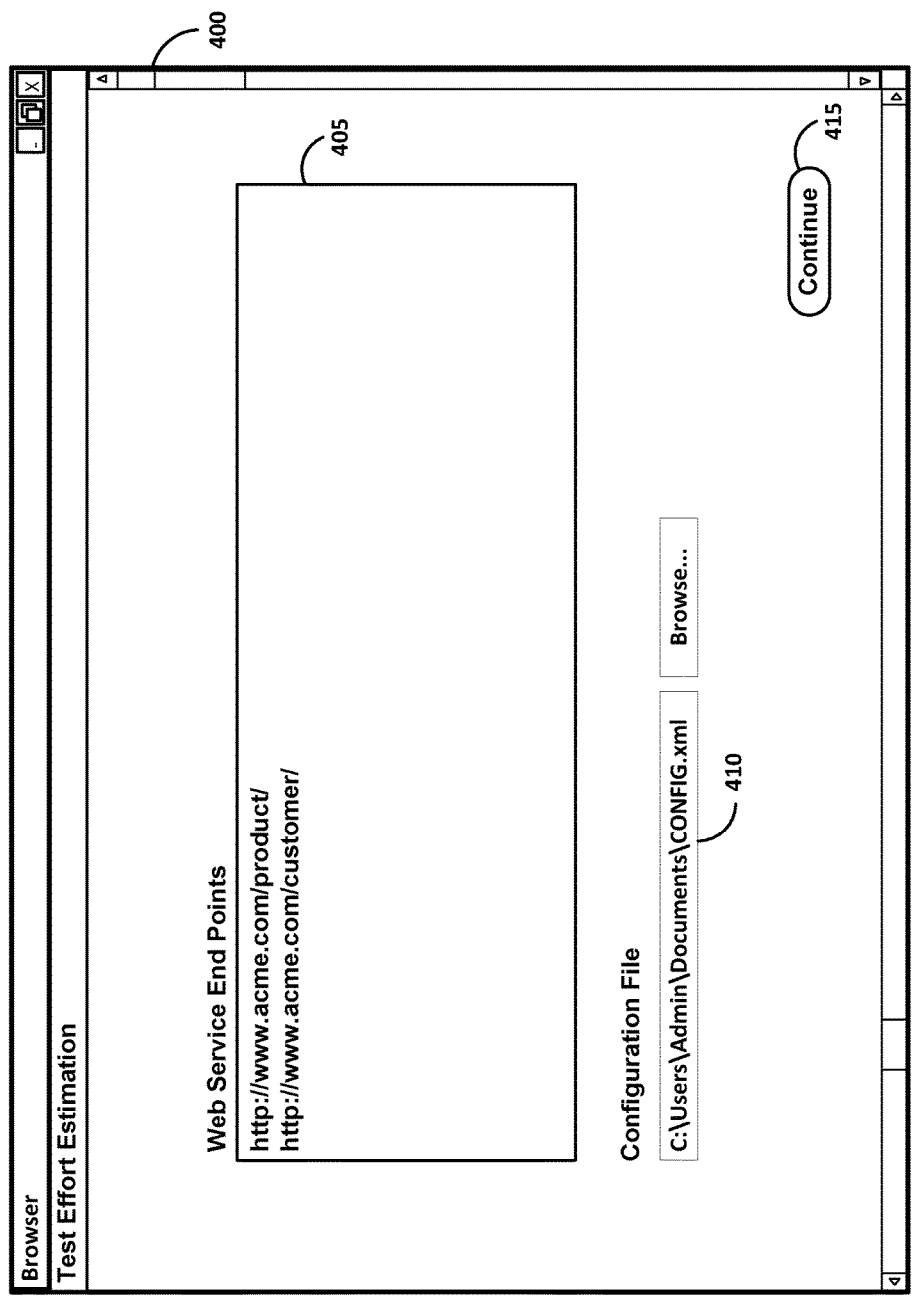

FIGS. 4A-4B together illustrate the manner in which user inputs for determining complexity levels of web service operations are provided in one embodiment, while FIG. 4C illustrates the manner in which the estimated effort required for testing a web service is displayed in one embodiment. Each of the Figures is described in detail below.

Display area 400 represents a portion of a user interface displayed on a display unit (not shown) associated with one of client systems 110A-110Z or administrator system 150. In one embodiment, display area 400 corresponds to a web page rendered by a browser executing on the client system/administrator system 150. Web pages are provided by administrator system 150 in response to a user/administrator sending appropriate requests (for example, by specifying corresponding URLs in the address bar) using the browser.

Referring to FIG. 4A, input field 405 facilitates a user to specify identifiers/end points of web services for which the effort for testing is sought to be estimated, while input field 410 facilitates a user to browse and upload a file containing the configuration data (according to XML). The user is shown as having specified the two web service end points "http://www.acme.com/product/" (corresponding to "PRODUCT_MANAGMENT" web service) and "http://www.acme.com/customer/" (assumed to correspond to a "CUSTOMER" web service in input field 405. The user is also shown as having uploaded the configuration data of FIG. 3B (as indicated by the file name "CONFIG.xml" in input filed 410).

The user may then select/click on "Continue" button 415 to send a request to administrator system 150, with the request data specifying the web services sought to be tested (as indicated in input field 405) and the configuration data of FIG. 3B.

Administrator system 150, in response to receiving the request, first retrieves the definitions/WSDL files for each of the web services specified in the request. As is well known, the WSDL file may be retrieved from an end point by sending a request to the end point with the text "?wsdl" appended. Thus, administrator system 150 may send a request to ""http://www.acme.com/product/?wsdl" and receive as a response to the request, the WSDL file for the "PRODUCT_MANAGMENT" web service. Similarly, administrator system 150 may download the WSDL files corresponding to other web services specified in the request.

Administrator system 150 then inspects each of the WSDL files to identify the web service operations provided by each web service and also the corresponding number of input and output parameters specified for each of the identified web service operations. In the following disclosure, it is assumed that administrator system 150 identifies that the "PRODUCT_MANAGMENT" web service contains 40 web service operations.

According to an aspect of the present disclosure, administrator system 150 provides/displays the details of the identified web service operations to a user/administrator to enable the user to provide inputs for some of the factors used in determining the complexity levels of the web service operations.

Referring to FIG. 4B, display area 400 there depicts a portion of a user interface provided by administrator system 150 in response to user clicking/selecting button 415 of FIG. 4A. Display area 420 displays in a tabular form, the details of each identified web service operation provided by each of the specified web services. Each of the rows in display area 420 specifies the details of a corresponding identified web service operation. For example, row 430 is shown displaying the details of the "GETSUPPLIER_DETAILS" web service operation of the "PRODUCT_MANAGMENT" web service. Only a sample set of rows are shown in FIG. 4B for illustration, though in actual embodiments, rows corresponding to all of the web service operations (for example, the 40 web service operations of "PRODUCT_MANAGMENT" web service) for all of the specified web service(s) would be displayed as corresponding rows in display area 420.

Column "Web Service Name" indicates the name of web service providing the web service operation, column "Web Service Operation Name" indicates the name of web service operation using which the web service operation may be accessed/executed, "Elements in Request" indicates the number of elements to be sent in the request to the web service operation, "Elements in Response" indicates the number of elements received in the response received from the web service operation. It may be appreciated that the details provided in all the above noted columns may be determined by inspecting the definitions of the web services received in the request/sought to be tested.

Display area 420 is also shown containing columns "Transformations/Conditions" and "Downstream Interactions" with corresponding input fields that facilitates a user/administrator to respectively specify the number of transformations and conditions implemented (functional complexity) and the number of interactions with downstream systems for each of the identified/displayed web service operations. In addition, column "Complexity Level" indicates the level of complexity determined (as in step 250) for the web service operation based on the values in columns "Elements in Request" (P), "Elements in Response" (Q), "Transformations/Conditions" (R) and "Downstream Interactions" (S).

In one embodiment, the complexity level of each web service operation is dynamically determined, in response to the user changing any of the values in the input fields of display area 420. In particular, the values of P, Q, R and S specified in display area 420 for a web service operation is compared with the ranges shown in table 310 of FIG. 3A, and a corresponding complexity level for the web service operation is determined and displayed. For example, for the web service operation "GETSUPPLIER_DETAILS" in row 430 having the values as P=3, Q=50, R=10, and S=3, administrator system 150 determines the complexity level for the web service operation as "High" in view of the values for Q, R and S being within the respective ranges of 50 to 20, 15 to 10 and 1 to 1. As noted above, the value of P being not in the range of 50 to 20 is not taken into consideration, as the highest range in which the values are included in for the complexity level "High". Accordingly, administrator system 150 displays the value "High" under column "Complexity Level" for row 430. Similarly, administrator system 150 determines the complexity levels for each of the web service operations displayed in display area 420.

Once the complexity levels of all the web service operations are determined, the user may select/click on "Estimate" button 440 to send a request to administrator system 150 to estimate the effort required for testing the specified web services (deployed in enterprise system 100). The manner in which administrator system 150 computes and displays the estimated effort is described below with examples.

8. Computing and Displaying Estimated Effort

In response to a user/administrator clicking button 440, administrator system 150 first determines the number of web service operations (of a single web service) that have been determined to have "High" complexity level (Nh), "Medium" complexity level (Nm) and "Low" complexity level (Nl). The description is continued assuming that for the web service named "PRODUCT_MANAGEMENT", the values are Nh=10, Nm=20 and Nl=10.

Administrator system 150 then inspects the configuration data (as shown in FIG. 3B) to identify the number of test cases to be prepared for each of "High" complexity level (Th), "Medium" complexity level (Tm) and "Low" complexity level (Tl). For the configuration data of FIG. 3B, administrator system 150 identifies Th=80, Tm=45 and Tl=20. In addition, administrator system 150 also identifies based on the configuration data of FIG. 3B, the weights/percentages according to which the number of cases are to be split up for each complexity level.

For example, administrator system 150 identifies that for "High" complexity level, the weights for the test case categories "High" (Whh), "Medium" (Whm) and "Low" (Whl) are respectively 0.55, 0.25 and 0.10. Administrator system 150 then computes the total number of test cases of "High" test case complexity category (TCh) using the below formula (where * is the multiplication operator):

$$TCh = Whh*Th*Nh + Whm*Tm*Nm + Whl*Tl*Nl$$
$$= 0.55*80*10 + 0.25*45*20 + 0.1*20*10$$
$$= 440 + 225 + 20$$
$$= 685 \text{ test cases}$$

Similarly, the total number of test cases of "Medium" test case complexity category (TCm) and the total number of test cases of "Low" test case complexity category (TCl) are computed using the formulas:

$$TCm = Wmh*Th*Nh + Wmm*Tm*Nm + Wml*Tl*Nl$$
$$= 810 \text{ test cases}$$

$$TCl = Wlh*Th*Nh + Wlm*Tm*Nm + Wll*Tl*Nl$$
$$= 405 \text{ test cases}$$

Where Wmh, Wmm and Wml respectively are the weights for the test case categories "High", "Medium" and "Low" for the web service operation complexity level of "Medium" (having the respective values of 0.35, 0.5 and 0.4) and Wlh, Wlm and Wll respectively are the weights for the test case categories "High", "Medium" and "Low" for the web service operation complexity level of "Low" (having the respective values of 0.1, 0.25 and 0.5).

Administrator system 150 then computes the total number of test cases to be prepared for testing the 40 web service operations of the web service "PRODUCT_MANAGEMENT" using the formula:

$$TTC = TCh + TCm + TCl$$
$$= 1900 \text{ test cases}$$

According to an aspect of the present disclosure, administrator system 150 also identifies based on the configuration data (of FIG. 3B) the corresponding design effort and execution effort for each of the test case categories. In particular, administrator system 150 identifies for the "High" test case category the corresponding design effort (TDh) and execution effort (TEh), for the "Medium" test case category the corresponding design effort (TDm) and execution effort (TEm) and for the "Low" test case category the corresponding design effort (TDl) and execution effort (TEl).

Administrator system 150 then calculates a total design effort (TPE) required for preparing the total number of test cases for testing the different operations of the web service and a total execution effort (TEE) for execution of the calculated total number of test cases using the below formulas:

$$TPE = TCl*TDl + TCm*TDm + TCh*TDh$$
$$= 63225 \text{ minutes}$$
$$= 1054 \text{ hours (rounded up)}$$

$$TEE = TCl*TEl + TCm*TEm + TCh*TEh$$
$$= 16445 \text{ minutes}$$
$$= 274 \text{ hours (rounded down)}$$

Administrator system 150 then also computes an effort for test designing (ETD) based on the calculated total design effort TPE and the time required for other test planning activities (which are specified as a percentage of TPE) and an effort for test execution (ETE) based on the calculated total execution effort TEE and the time required for other test execution activities (which are specified as a percentage of TEE). A total test effort is then calculated using the below formula:

Total Test Effort=ETD+(ETE*Ec)+Er

Where Ec is the number of execution cycles of testing to be performed and Er is the effort (in hours) for overcoming any risks associated with testing the web service. Er takes into consideration factors such as test environment availability, skill level of the testers, etc.

Assuming the number of execution cycles is 2 and the effort for overcoming any risks Er=100 hours, the total test effort is calculated based on the above noted values as approx 2171 hours. Administrator system 150 then provides/displays the details of estimated effort to a user/administrator as described in detail below.

FIG. 4C illustrates the manner in which the estimated effort required for testing a web service is displayed in one embodiment. Display area 400 of FIG. 4C depicts a portion of a user interface provided by administrator system 150 in response to user clicking/selecting button 440 of FIG. 4B. Display area 450 indicates that the test estimation results are being provided for the web service named "PRODUCT_MANAGEMENT", and that the web service was identified to provide 40 web service operations. Display area 460 displays the configuration data of FIG. 3B in tabular form, for the convenience of the user/administrator.

Display area 470 displays the details of calculation of the effort for test designing (ETD) in tabular form, while display area 480 displays the details of calculation of the effort for test execution (ETE) in tabular form. Display area 490 displays the details of calculation of the total test effort in tabular form. Thus, a user/administrator is provided an estimate of the effort required for testing a web service deployed in an enterprise system.

Though the above description is provided with respect to estimating effort for testing a single web service, it may be appreciated that the effort for multiple web services may be estimated by iteratively performing the above noted actions of determining complexity levels of the web service operations, identifying test cases for each web service operation and computing the total test cases for each of the web services deployed in the enterprise system, as will be apparent to one skilled in the relevant arts by reading the disclosure herein.

It should be further appreciated that the features described above can be implemented in various embodiments as a desired combination of one or more of hardware, executable modules, and firmware. The description is continued with respect to an embodiment in which various features are operative when the software instructions described above are executed.

9. Digital Processing System

Figure 5:
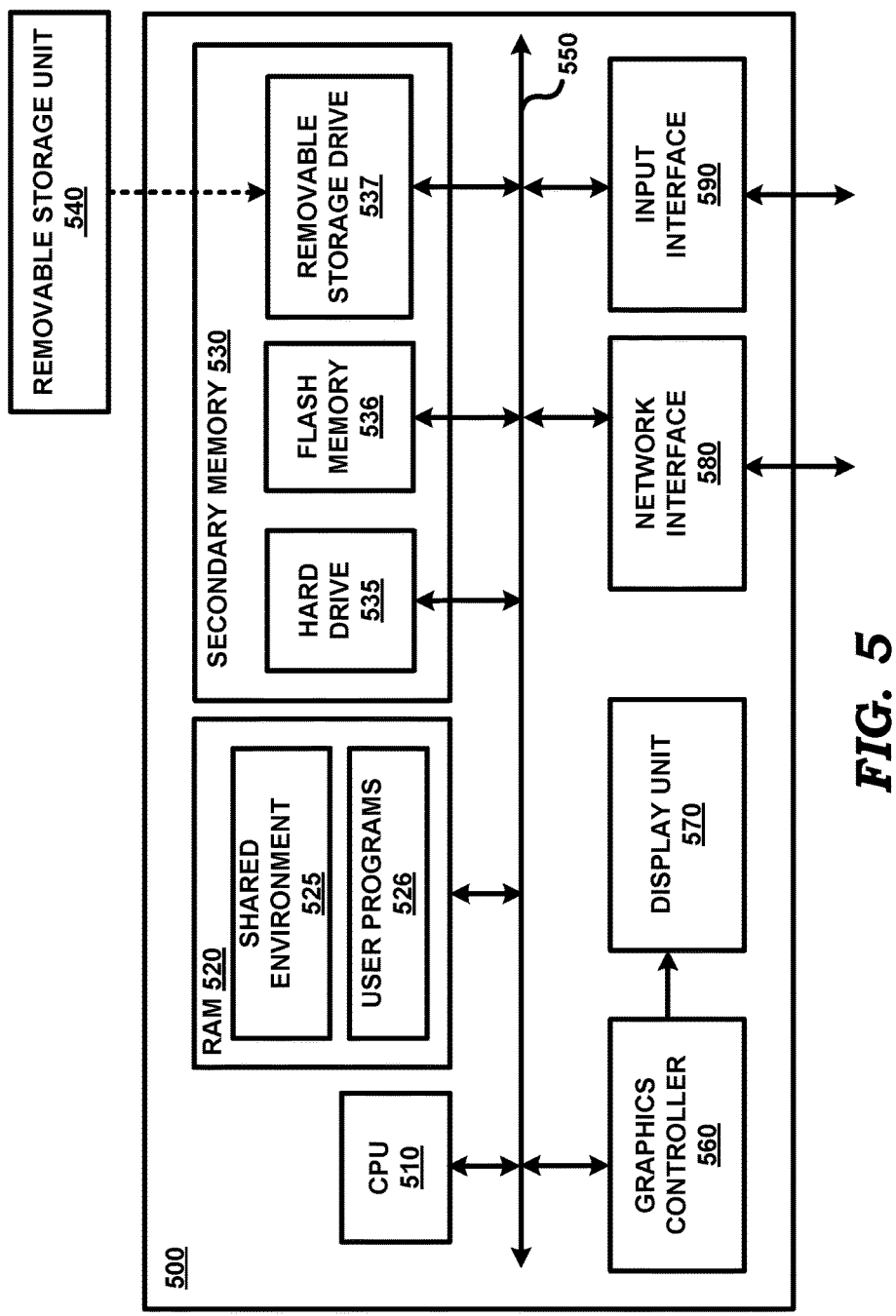
FIG. 5 is a block diagram illustrating the details of a digital processing system in which various aspects of the present disclosure are operative by execution of appropriate executable modules.

FIG. 5 is a block diagram illustrating the details of digital processing system 500 in which various aspects of the present disclosure are operative by execution of appropriate executable modules. Digital processing system 500 corresponds to disruption management server 150.

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions constituting shared environment 525 and user programs 526. Shared environment 525 includes operating systems, device drivers, virtual machines, etc., which provide a (common) run time environment for execution of user programs 526.

Graphics controller 560 generates display signals (e.g., in RGB format) to display unit 570 based on data/instructions received from CPU 510. Display unit 570 contains a display screen to display the images defined by the display signals (for example, portions of the user interfaces of FIGS. 4A-4C). Input interface 590 may correspond to a keyboard and a pointing device (e.g., touch-pad, mouse) and may be used to provide appropriate inputs (for example, inputs provided using the user interfaces of FIGS. 4A-4C). Network interface 580 provides connectivity to a network (e.g., using Internet Protocol), and may be used to communicate with other systems (of FIG. 1) connected to the network.

Secondary memory 530 may contain hard drive 535, flash memory 536, and removable storage drive 537. Secondary memory 530 may store the data (for example, portions of the data shown in FIGS. 3A-3C) and software instructions (for implementing the flowchart of FIG. 2), which enable digital processing system 500 to provide several features in accordance with the present disclosure. The code/instructions stored in secondary memory 530 may either be copied to RAM 520 prior to execution by CPU 510 for higher execution speeds, or may be directly executed by CPU 510.

Some or all of the data and instructions may be provided on removable storage unit 540, and the data and instructions may be read and provided by removable storage drive 537 to CPU 510. Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method of estimating effort required for testing web services deployed in an enterprise system, the method comprising:
   maintaining a configuration data specifying a plurality of complexity levels of web service operations, and a number of test cases required for each of said plurality of complexity levels;
   receiving data specifying a first web service sought to be tested, said first web service being deployed in said enterprise system;
   inspecting a definition of said first web service to identify a first plurality of web service operations provided by said first web service,
   wherein said inspecting also identifies for each web service operation of said first web service, a first number of input parameters for the web service operation and a second number of output parameters for the web service operation;
   for each web service operation of said first plurality of web service operations:
      receiving from a user, a third number and a fourth number, said third number indicating a number of transformations and conditions implemented in said web service operation, said fourth number indicating a number of downstream systems the web service operation interacts with;
      determining a complexity level of said web service operation based on said first number, said second number, said third number and said fourth number; and
      identifying, by examining said configuration data, a corresponding number of test cases required to be prepared for said complexity level of said web service operation; and
   computing a total number of test cases that are required to be prepared for testing said first web service based on said corresponding number of test cases identified for each of said first plurality of web service operations.

2. The method of claim 1, wherein each complexity level of said plurality of complexity levels is defined by a corresponding set of ranges for each of said first number, said second number, said third number and said fourth number.

3. The method of claim 1, wherein said configuration data specifies for each complexity level of said plurality of complexity levels, a split of said corresponding number of test cases among a set of test case complexity categories,
   wherein the number of test cases identified for a web service operation includes individual number of test cases for each of said set of test case complexity categories,
   and said total number of test cases computed for said first web service includes individual number of test cases for each of said set of test case complexity categories.

4. The method of 3, further comprising:
   receiving for each of said set of test case complexity categories, a corresponding design effort and a corresponding execution effort; and
   calculating a total design effort required for preparing said total number of test cases and a total execution effort for execution of said total number of test cases based on the individual number of test cases computed, said corresponding design effort, and said corresponding execution effort for each of said set of test case complexity categories.

5. The method of 4, wherein said data received specifies an end point for said first web service and an identifier for said configuration data.

6. The method of claim 5, wherein said definition of said first web service is according to web service definition language (WSDL).

7. The method of claim 1, wherein said total number of test cases is computed as the sum of said corresponding number of test cases for each of said first plurality of web service operations.

8. A non-transitory machine readable medium storing one or more sequences of instructions for causing a system to estimate effort required for testing web services deployed in an enterprise system, wherein execution of said one or more instructions by one or more processors contained in said system causes said system to perform the actions of:
   maintaining a configuration data specifying a plurality of complexity levels of web service operations, and a number of test cases required for each of said plurality of complexity levels;
   receiving data specifying a first web service sought to be tested, said first web service being deployed in said enterprise system,
   wherein said inspecting also identifies for each web service operation of said first web service, a first number of input parameters for the web service operation and a second number of output parameters for the web service operation;
   inspecting a definition of said first web service to identify a first plurality of web service operations provided by said first web service;
   for each web service operation of said first plurality of web service operations:

receiving from a user, a third number and a fourth number, said third number indicating a number of transformations and conditions implemented in said web service operation, said fourth number indicating a number of downstream systems the web service operation interacts with;

determining a complexity level of said web service operation based on said first number, said second number, said third number and said fourth number; and identifying, by examining said configuration data, a corresponding number of test cases required to be prepared for said complexity level of said web service operation; and computing a total number of test cases that are required to be prepared for testing said first web service based on said corresponding number of test cases identified for each of said first plurality of web service operations.

9. The non-transitory machine readable medium of claim 8, wherein each complexity level of said plurality of complexity levels is defined by a corresponding set of ranges for each of said first number, said second number, said third number and said fourth number.

10. The non-transitory machine readable medium of claim 8, wherein said configuration data specifies for each complexity level of said plurality of complexity levels, a split of said corresponding number of test cases among a set of test case complexity categories, wherein the number of test cases identified for a web service operation includes individual number of test cases for each of said set of test case complexity categories, and said total number of test cases computed for said first web service includes individual number of test cases for each of said set of test case complexity categories.

11. The method of 10, further comprising one or more instructions for:

receiving for each of said set of test case complexity categories, a corresponding design effort and a corresponding execution effort; and calculating a total design effort required for preparing said total number of test cases and a total execution effort for execution of said total number of test cases based on the individual number of test cases computed, said corresponding design effort, and said corresponding execution effort for each of said set of test case complexity categories.

12. The non-transitory machine readable medium of claim 8, wherein said total number of test cases is computed as the sum of said corresponding number of test cases for each of said first plurality of web service operations.

13. A digital processing system comprising:
a processor;
a random access memory (RAM);
a machine readable medium to store one or more instructions, which when retrieved into said RAM and executed by said processor causes said digital processing system to estimate effort required for testing web services deployed in an enterprise system, said digital processing system performing the actions of:
maintaining a configuration data specifying a plurality of complexity levels of web service operations, and a number of test cases required for each of said plurality of complexity levels;

receiving data specifying a first web service sought to be tested, said first web service being deployed in said enterprise system;

inspecting a definition of said first web service to identify a first plurality of web service operations provided by said first web service, wherein said inspecting also identifies for each web service operation of said first web service, a first number of input parameters for the web service operation and a second number of output parameters for the web service operation;

for each web service operation of said first plurality of web service operations:

determining a complexity level of said web service operation based on said first number, said second number, said third number and said fourth number; and identifying, by examining said configuration data, a corresponding number of test cases required to be prepared for said complexity level of said web service operation; and computing a total number of test cases that are required to be prepared for testing said first web service based on said corresponding number of test cases identified for each of said first plurality of web service operations.

14. The digital processing system of claim 13, wherein each complexity level of said plurality of complexity levels is defined by a corresponding set of ranges for each of said first number, said second number, said third number and said fourth number.

15. The digital processing system of claim 12, wherein said configuration data specifies for each complexity level of said plurality of complexity levels, a split of said corresponding number of test cases among a set of test case complexity categories, wherein the number of test cases calculated for a web service operation includes individual number of test cases for each of said set of test case complexity categories, and said total number of test cases computed for said first web service includes individual number of test cases for each of said set of test case complexity categories.

16. The digital processing system of 15, further performing the actions of:

receiving for each of said set of test case complexity categories, a corresponding design effort and a corresponding execution effort; and calculating a total design effort required for preparing said total number of test cases and a total execution effort for execution of said total number of test cases based on the individual number of test cases computed, said corresponding design effort, and said corresponding execution effort for each of said set of test case complexity categories.

17. The digital processing system of claim 12, wherein said total number of test cases is computed as the sum of said corresponding number of test cases for each of said first plurality of web service operations.

* * * * *